Feb. 6, 1923.
D. G. ROOS.
OILING DEVICE.
FILED MAR. 1, 1918.
1,444,036
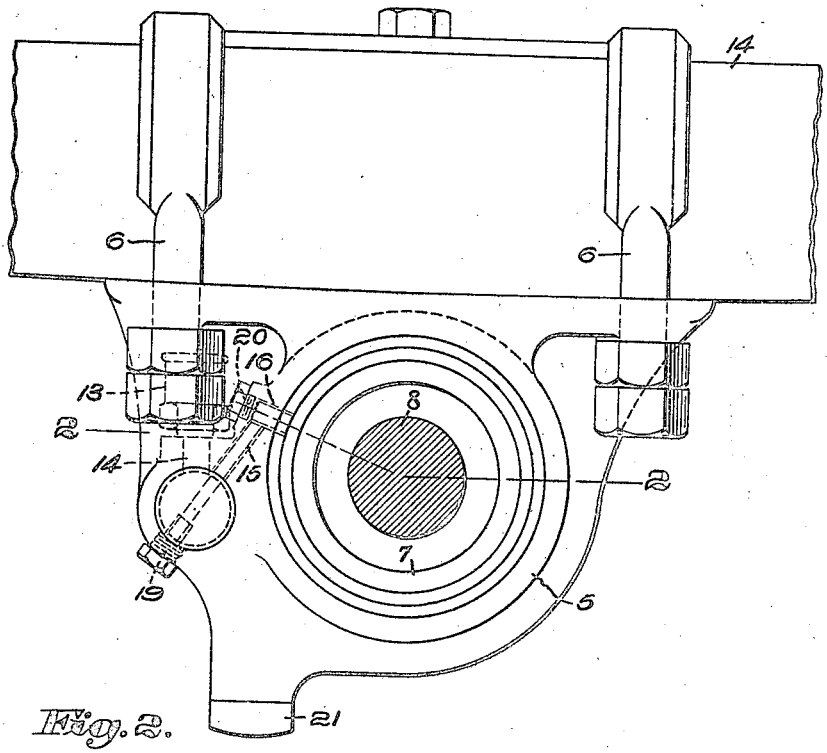
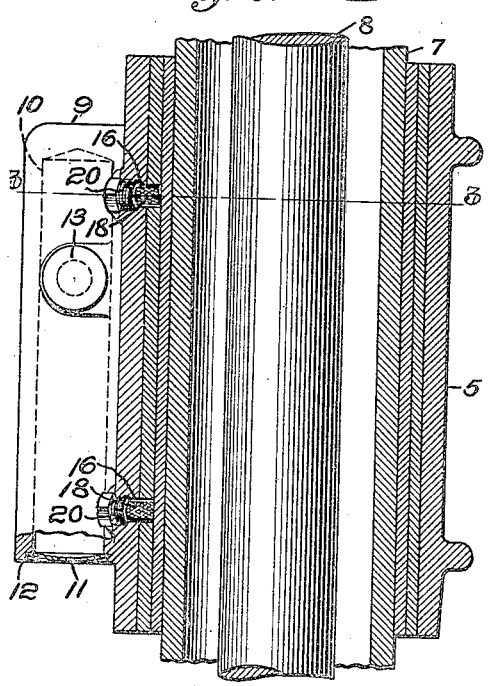
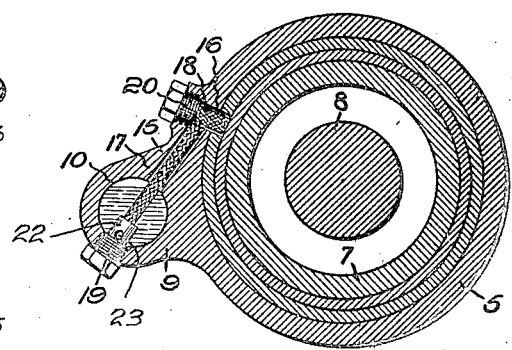
Inventor:
Delmar G. Roos.

Patented Feb. 6, 1923.

1,444,036

UNITED STATES PATENT OFFICE.

DELMAR G. ROOS, OF BRIDGEPORT, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

OILING DEVICE.

Application filed March 1, 1918. Serial No. 219,743.

*To all whom it may concern:*

Be it known that I, DELMAR G. ROOS, a citizen of the United States, and a resident of Bridgeport, county of Fairfield, and State of Connecticut, have invented an Improvement in Oiling Devices, of which the following description, in connection with the accompanying drawings, is a specification, like characters on the drawings representing like parts.

This invention relates to oiling devices, and is more particularly concerned with a spring-chair oiler for lubricating the cooperating bearing surfaces of a spring-chair and axle of a motor vehicle.

My invention will be best understood by reference to the following description, when taken in connection with the accompanying drawings of one specific embodiment thereof, while its scope will be more particularly pointed out in the appended claims.

In the drawings:

Fig. 1 is a side elevation, partly in section, of an axle, a spring and a spring-chair, having oiling devices embodying my invention;

Fig. 2 is a plan sectional view on line 2—2 of Fig. 1; and

Fig. 3 is a cross-sectional view on line 3—3 of Fig. 2.

Referring to the drawings, and to the embodiment of my invention which is illustrated therein, I have shown a portion of a vehicle spring 14, seated upon and secured to a spring-chair 5 in any usual or desired manner, as by means of a pair of U-bolts 6. The spring-chair is mounted to turn on a suitable axle comprising a tubular housing 7, within which a live axle or shaft 8 is mounted to turn in a usual and well-known manner.

As a means for lubricating the cooperating bearing surfaces of the axle and the spring-chair, I have herein provided the latter with a preferably integral oil reservoir 9, which may, and preferably does, extend generally parallel with the axle, as best shown in Fig. 2. This reservoir is herein in the form of a laterally projecting lug provided with a horizontal chamber 10, constituting a reservoir to receive the oil supply. One simple and convenient way of making this chamber is to core a hole in the casting, no machine operation being required for the reservoir itself other than to counterbore the end and to close the entrance by suitable means, such for example as a plug or plate 11 forced into an annular recess 12 in the end of the lug, as shown in Fig. 2. By this means, I am enabled to provide a reservoir of large capacity, while its character is such as to add to the strength of the spring chair by placing the material farther away from the neutral axes. The oil may be introduced into this chamber through any suitable means, such for example as an oil cup 13, adapted to deliver oil through a passage 14 into said chamber.

As a means for conducting oil from the reservoir to the bearing surfaces, I have herein shown a plurality of passages 15, which preferably extend in an upward direction therefrom, and communicate with passages 16 leading to the bearing surfaces. If desired, the motion of the vehicle might be relied upon to cause oil to be delivered from the reservoir to the bearing surfaces, but I prefer to provide suitable means for feeding the oil by capillary action, since the oil is thereby fed at a slow rate which is very desirable with oil lubrication. The capillary feeding means herein comprises wicks 17 and 18, best shown in Fig. 3. These wicks may be introduced by providing suitable plugs 19 and 20, screwed into holes tapped in the spring-chair, as shown in Fig. 3. Preferably the wicks are so made as to be readily replaceable, as by mounting them in their respective plugs. For example, the plug 19 is herein provided with a hollow wick-holder 22, having an opening 23 to feed oil to the wick when the oil level is low in the reservoir. By merely unscrewing the plug, the wick can be withdrawn and replaced, should it become gummed or clogged with dirt. In practice, the reservoir will be kept well filled with oil introduced through the oil cup, and oil will be fed by the wicks to the bearing surfaces in a most economical yet efficient manner. With this construction, the oil can be fed at or near the point of greatest pressure, thus giving the best results in economy in the use of oil and insuring long wear of the bearing surfaces.

One of the best advantages of the described oiling device is that there is no likelihood of injury to the same when an elevating jack is applied to the axle, since the reservoir is formed as an integral lug. In practice, the spring-chair is usually provided with a second lug 21, to rest upon the jack when the axle is being jacked up. In no case, however, can any injury to the oiling device take place through carelessness in operating the jack, since the reservoir is an integral part of the axle, and since it affords ample protection for the oil cup, which stands in an upright position where it is well protected from injury.

While I have herein shown and described one specific form or embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described my invention, what I claim and desire by Letters Patent to secure is:

1. In a vehicle, the combination of an axle, and a spring-chair mounted to turn on said axle, said spring-chair having an integral lug provided with a chamber constituting an oil reservoir, and a removable wick-holder having a passage leading from said reservoir toward the cooperating bearing surfaces of said axle and spring-chair.

2. In a vehicle, the combination of an axle, and a spring-chair mounted to turn on said axle, said spring-chair having an integral lug provided with a horizontal chamber extending into said lug and constituting an oil reservoir, and means for feeding oil from said chamber to the cooperating bearing surfaces of said axle and spring-chair.

3. In a vehicle, the combination of an axle, and a spring-chair supporting said spring and mounted to turn on said axle, said spring-chair having an integral lug provided with a horizontal chamber extending into said lug and constituting an oil reservoir having closed ends, and means for feeding oil from said chamber to the cooperating bearing surfaces of said axle and spring-chair.

4. The combination of inner and outer parts one working in the other, said outer part having a reservoir, a wick for feeding oil from said reservoir to the bearing surfaces of said parts, and an outwardly removable wick holder provided with a chamber receiving said wick, the lateral walls of said holder embracing and grasping said wick.

5. The combination of inner and outer members one turning within the other, said outer member having a reservoir, a wick for feeding oil from said reservoir to the bearing surfaces of said members, and a removable plug having a chamber receiving said wick, and an opening leading from said reservoir into said chamber to feed oil to said wick.

6. The combination of inner and outer members, one turning within the other, said outer member being provided with a reservoir generally parallel with the axes of said members, a passage leading in an upward direction and intersected by said reservoir and delivering oil therefrom to the bearing surfaces of said members, and means normally closing the outer end of said passage.

7. The combination of inner and outer members, one turning within the other, said outer member being provided with a reservoir and two intersecting passages, one leading in an upward direction and intersected by said reservoir and the other leading from the first-mentioned passage toward the bearing surfaces of said members, and plugs closing the outer ends of said passages.

8. The combination of inner and outer members, one turning within the other, said outer member being provided with a reservoir and two intersecting passages one leading in an upward direction and intersected by said reservoir and the other leading from the first-mentioned passage toward the bearing surfaces of said members, plugs closing the outer ends of said passages, and means held by said plugs for feeding oil by capillary action from said reservoir through said passages to said bearing surfaces.

9. The combination of inner and outer members, one turning within the other, said outer member being provided with a reservoir and two intersecting passages one leading in an upward direction from said reservoir and the other leading therefrom toward the bearing surfaces of said members, and two distinct wicks received in said passages, respectively, to feed oil from said reservoir to said bearing surfaces, one of said wicks abutting endwise against the side of the other.

10. The combination of inner and outer members, one turning within the other, said outer member being provided with a reservoir and two intersecting passages one leading in an upward direction from said reservoir and the other leading therefrom toward the bearing surfaces of said members, wicks received in said passages, respectively, to feed oil from said reservoir to said bearing surfaces, and removable wick holders for said wicks, respectively.

In testimony whereof, I have signed my name to this specification.

DELMAR G. ROOS.

Certificate of Correction.

It is hereby certified that in Letters Patent No. 1,444,036, granted February 6, 1923, upon the application of Delmar G. Roos, of Bridgeport, Connecticut, for an improvement in "Oiling Devices," errors appear in the printed specification requiring correction as follows: Page 2, lines 31 and 32, claim 1, strike out the words "a removable wick-holder having"; same page, lines 44 and 45, claim 3, strike out the words "supporting said spring and"; and that the said Letters Patent should be read with these corrections therein that the same may conform to the record of the case in the Patent Office.

Signed and sealed this 17th day of April, A. D., 1923.

[SEAL.]

KARL FENNING,
*Acting Commissioner of Patents.*